United States Patent [19]

Piatt et al.

[11] Patent Number: 4,734,711

[45] Date of Patent: Mar. 29, 1988

[54] PRESSURE REGULATION SYSTEM FOR MULTI-HEAD INK JET PRINTING APPARATUS

[75] Inventors: Michael J. Piatt, Enon; Kevin L. Houser, Kettering, both of Ohio

[73] Assignee: Eastman Kodak Company, Rochester, N.Y.

[21] Appl. No.: 945,265

[22] Filed: Dec. 22, 1986

[51] Int. Cl.$^4$ ........................ G01D 15/18; F04B 49/00

[52] U.S. Cl. .................................. 346/75; 346/140 R; 134/12; 417/36; 417/38; 417/44

[58] Field of Search ............... 346/75, 140 R; 137/12; 417/36, 38, 44

[56] References Cited

U.S. PATENT DOCUMENTS

| | | | |
|---|---|---|---|
| 3,787,882 | 1/1974 | Fillmore et al. | 346/75 |
| 3,958,898 | 5/1976 | Abrahams et al. | 417/36 |
| 4,318,114 | 3/1982 | Huliba | 346/140 R |
| 4,511,311 | 4/1985 | Olson | 417/5 X |

*Primary Examiner*—E. A. Goldberg
*Assistant Examiner*—Gerald E. Preston
*Attorney, Agent, or Firm*—John D. Husser

[57] ABSTRACT

A regulation system controls the print head pressures of a plurality of discrete ink jet printers of the continuous type to the same nominal pressure, while the printers use a common drive source to their own ink pumps. The regulation system includes bypass pressure detection passages extending from a tap in each printer's circulation system to a detection reservoir. Each bypass passage includes a bladder/valve portion whose exterior is in fluid communication with a detection fluid enclosed within the common reservoir. A transducer detects the pressure of the common reservoir and signals control of the common pump drive so as to regulate all print head pressures to the same nominal operating pressure.

7 Claims, 7 Drawing Figures

PRESSURE REGULATION SYSTEM FOR MULTI-HEAD INK JET PRINTING APPARATUS

BACKGROUND OF THE INVENTION.

1. Field of Invention

The present invention relates to simplified pressure regulation systems and more particularly to systems adapted to regulate the pressure of liquid discharge of a plurality of parallel liquid supply systems, e.g. the pressure of ink flow to a plurality of continuous ink jet printing heads.

2. Description of Background Art

In continuous ink jet printing apparatus which utilize a single print head, ink is pumped through a supply line from a supply reservoir to a print head, under sufficient pressure to cause ink streams to issue from the orifices of the print head. Stimulating vibrations are applied to the print head to cause those ink streams to form streams of uniformly sized and spaced droplets, which are electrically controlled into printing or non-printing paths. The non-printing droplets are returned to the supply reservoir via a droplet catcher and a return line. Usually there is a main return line which extends from a print head outlet to the ink reservoir to allow ink from the supply line to circulate through the print head, e.g. during start-up. Proper drop stream stimulation, as well as synchronization of droplet charging depend, in part, on maintaining a predetermined fluid pressure in the ink supplied to the print head.

Continuous ink jet printing systems have been proposed wherein a plurality of discrete orifice arrays cooperate in printing on a common print medium, e.g. to allow the use of different ink colors or to increase printing speed and/or printing resolution. These multi-head systems may or may not have separate ink reservoirs; however, in general, they utilize separate and completely duplicative ink circulation systems for each separate print head. Thus, each circulation system has its own separate pump motor and its own discrete system for regulating its print head ink pressure. Clearly it would be desirable from the viewpoints of cost, simplicity, apparatus size and reliability to reduce such duplication of components.

From the printing performance veiwpoint, the approach utilizing a plurality of completely separate ink circulation systems can operate successfully with slightly differing print head pressures by employing, for each print head, a servo system that cooperatively adjusts print head pressure and stimulation amplitude to: (i) avoid satellite droplets and (ii) achieve the proper filament break-off position. However, where a common stimulator operates on a plurality of print heads, the cooperative adjustment technique is not available, and it becomes very important for the print heads' ink pressures to be precisely the same. Also, when applying ink droplets from a plurality of print heads to a common substrate, drop placement accuracy requires equal print head droplet velocities, which in turn depends on equal ink supply pressures to the print heads. Thus, it can be seen that there are various printing performance needs for attaining the same nominal ink pressures for cooperative print heads. Attainment of such equal ink pressures in independent circulation systems having their own dedicated pressure regulation subsystems requires expensive calibration of each of the transducer/pump sets of the separate ink circulation systems.

SUMMARY OF INVENTION

A significant purpose of the present invention is to provide a unique pressure regulation approach that avoids the various problems and disadvantages, such as noted above, which are inherent to prior art approaches for supplying a plurality of inks to multiple print heads of continuous ink jet printing apparatus.

Another important object is to improve the quality, simplicity and flexibility of pressure regulation for such plural liquid circulation systems.

One important advantage attained by the present invention is a reduction in the number of system components required to regulate the supply pressure of liquids respectively provided to a plurality of different discharge members, such as ink jet printing heads.

In one aspect the present invention constitutes an improved pressure regulation system for continuous ink jet printing apparatus of the kind having a plurality of discrete ink circulation systems wherein separate pumps respectively circulate ink to their print heads from supply reservoirs. The improved pressure regulation system comprises: (a) a plurality of bypass conduits each extending away from, and back to, its respective circulation system and including an expandable and collapsible pliant portion; (b) a common pressure reservoir including a rigid housing confining a detection fluid mass in common fluid communication with each system's pliant portion; (c) a source of variable pump drive commonly coupled to each of the system pump means; and (d) detection and control means for regulating the common drive source in response to variations in the pressure of the detection fluid to maintain each of the print heads at the same nominal pressure.

In one preferred embodiment, the expandable and collapsible portion of the regulation system is: (i) embodied within an ink chamber having an ink inlet passage, an ink outlet passage and a pressure control opening adjacent the common pressure reservoir and (ii) constructed and mounted so as to expand or contract within the chamber in response to fluid pressure differentials thereacross.

BRIEF DESCRIPTION OF THE DRAWINGS

The subsequent description of preferred embodiments of the invention refers to the attached drawings wherein.

DETAILED DESCRIPTION OF THE PREFERRED EMBODIMENTS

Figure 1:
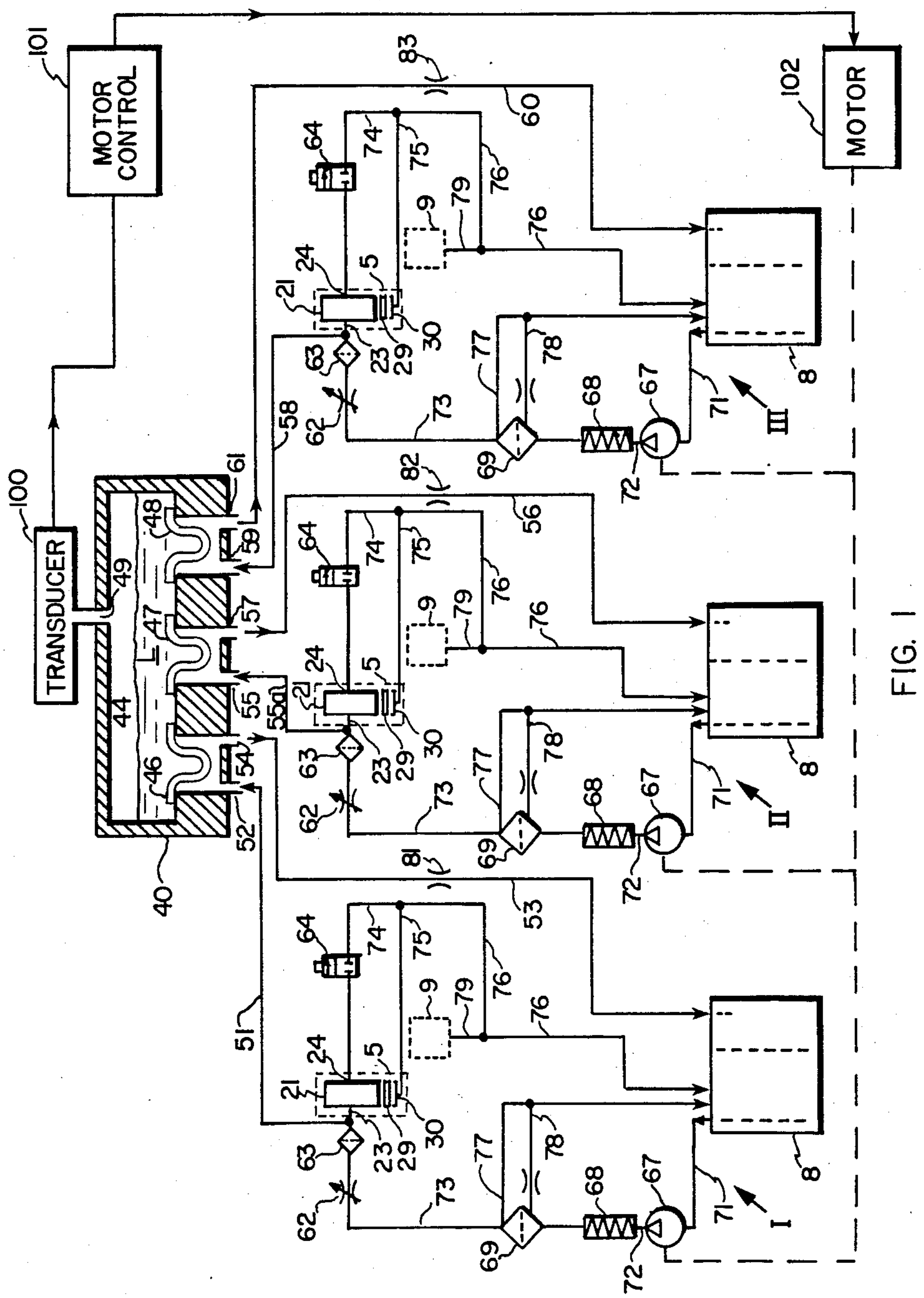
FIG. 1 is a schematic diagram of an exemplary multicolor, continuous ink jet printer incorporating one embodiment of the present invention.
Figure 2A:
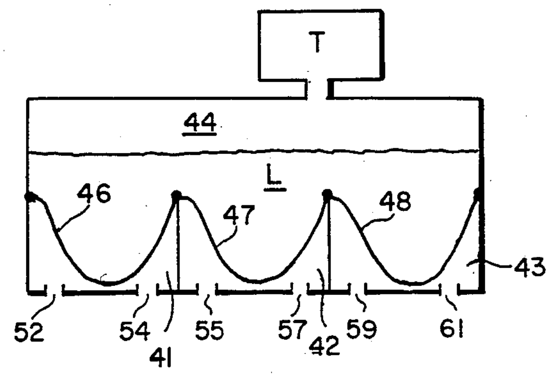
FIGS. 2-A through 2-D are schematic cross-sectional views showing portions of the FIG. 1 pressure control system at different operative stages.
Figure 2B:
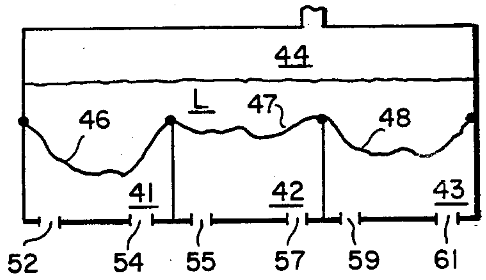
Figure 2C:
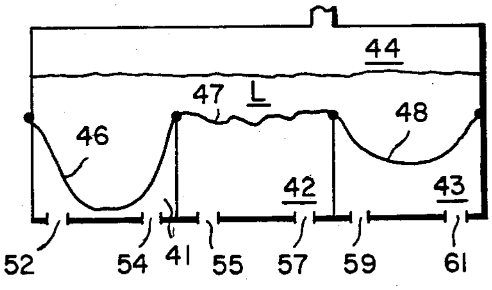
Figure 2D:
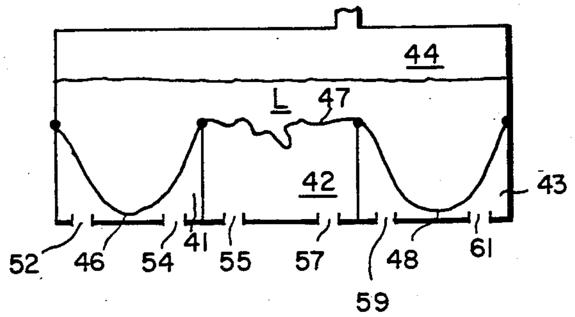

Referring to FIG. 1, it can be seen that the schematically illustrated continuous ink jet printer system comprises three distinct ink circulation subsystems I, II and III, respectively for effecting the supply and return of ink between each subsystem ink reservoir 8 and subsystem print station 5. In the illustrated embodiments the subsystems are substantially identical and therefore like components of the subsystems are denoted by the same numeral.

As illustrated schematically, each subsystem print head assembly 5 includes a print head body 21 having an inlet for receiving ink and orifices for directing droplet streams past a charge plate assembly 29 and either onto a print medium or into a catcher assembly 30 for return to the ink reservoir. In the illustrated embodiment, each print head assembly 5 is adapted for traversing movement across a print path and to a start-up/storage position over a home station 9. It is to be noted however, that the concepts of the present invention are equally useful to continuous ink jet printing systems wherein the printing orifices do not traverse the print path.

By way of general technical background, the upper print head portion also includes a suitable transducer means (not shown) for imparting mechanical vibration to the print head body. Such transducer can take various forms known in the art for producing periodic perturbations of the ink filament(s) issuing from the orifice plate to assure formation break-up of the ink filaments into streams of uniformly spaced ink droplets. One preferred kind of construction for the print head body and transducer is disclosed in U.S. application Ser. No. 390,105, entitled "Fluid Jet Print Head" and filed June 21, 1982, now continuation-in-part, Ser. No. 06/777,102 filed Sept. 17, 1985 in the name of Hilarion Braun; however, a variety of other constructions are useful in accord with the present invention. Preferred orifice plate constructions for use in accord with the present invention are disclosed in U.S. Pat. No. 4,184,925; however, a variety of other orifice constructions are useful.

The lower portion of print head assembly 5 includes a charge plate 29 constructed to impart desired charge upon ink droplets at the point of filament break-up and a drop catcher 30 that is constructed and located to catch non-printing droplets (in this arrangement charged droplets). Exemplary preferred charge plate constructions are disclosed in U.S. Pat. No. 4,223,321; however, other charge plate constructions are useful in accord with the present invention. Exemplary catcher configurations are described in U.S. Pat. Nos. 3,813,675; 4,035,811 and 4,268,836; again other constructions are useful.

During the printing operation ink filaments are ejected through the orifices in plate and, under the influence of the transducer on the print head, break up into streams of uniformly sized and spaced droplets. The charge plate is located proximate the zone of filament break-up and is adapted to selectively charge or not charge each droplet in each of the streams in accordance with information signals respectively transmitted to the various charge sectors of the charge plate. The charged droplets are deflected to catcher 30 for recirculation back to the ink print head, while uncharged droplets pass on to the print substrate.

The ink supply and circulation subsystems shown in FIG. 1 include various ink conduits or "lines" which form the ink circulation path. Specifically, pump inlet line 71 extends from ink supply reservoir 8 to the inlet of pump 67, pump outlet line 72 extends between pump 67 and main filter 69, head supply line 73 extends from main filter 69 to the print head inlet and head return line 74 extends from the print head outlet to a junction between catcher return line 75 and the main ink return line 76. The main return line 76 is also connected to home station return line 79. An air bleed line 78 and an ink bypass line 77 extend from main filter 69 back to reservoir 8. As will be clear from the subsequent description, the present invention is highly useful in, but not limited to use with, the particular ink circulation line arrangement shown in FIG. 1. Other elements of the FIG. 1 embodiment such as ink heater 68, variable flow restrictor 62, final filter 63 and head return valve 64 are not necessary for the practice of the present invention, but can be usefully incorporated with it.

Turning now to the unique features of the present invention shown in FIG. 1, it can be seen that each of the ink circulation subsystems I–III comprise a pressure detection bypass branch extending to and from a pressure referencing assembly, denoted generally 40. Thus the subsystem I branch comprises an ink egress line 51 extending from a junction with its ink supply line 73 (that is immediately upstream of the print head inlet 23) to an inlet 52 to assembly 40 and an ink ingress line 53 extending from an outlet 54 of assembly 40 back to its ink supply reservoir 8. Similarly, the subsystem II bypass branch comprises egress line **55*a* to inlet 55 and ingress line 56 from outlet 57 to its reservoir 8 and the subsystem III bypass branch comprises egress line 58 to inlet 59 and ingress line 60 from outlet 61 to its reservoir 8. It will be noted that each of ingress lines 53, 56 and 60 include a flow restriction, respectively 81, 82 and 83**, for purposes to be described.

As shown in FIG. 1, pressure referencing assembly 40 comprises three discrete ink-flow chambers 41, 42, 43 which are incorporated respectively in the bypass branches of subsystems I, II and III so that ink flowing through those branches passes through their respective ink-flow chamber. The upper portion of assembly 40 is formed as a common pressure reservoir 44, which is separated from each of the ink flow chambers respectively by resilient membranes 46, 47 and 48 and which has an opening 49 communicating with a pressure transducer 100. As will be described subsequently, the chamber 44 can contain a compressible gas, e.g. air, or preferably a compressible gas and a liquid L, e.g. water.

Transducer 100 is constructed to detect a change in pressure of reservoir 40 (e.g. a drop below a nominal pressure) and to provide an appropriate electrical signal to motor control circuit 101. In response to such signal from transducer 100, control circuit 101 appropriately adjusts the speed of motor 102. As indicated schematically by the dotted lines in FIG. 1, motor 102 is mechanically coupled to drive the pumps 67 of each of the subsystems I–III. During printing operations of the three ink system, the pressure conditions of the ink flows through chambers 41, 42 and 43 are imparted through membranes 46, 47 and 48 to common pressure reservoir 44. The pressure condition in reservoir 44 is detected by transducer 100 and utilized to control the motor 102 to maintain the pressure at each of the print head inlets 23 at the same and proper operating pressure. The mechanisms whereby this advantageous result is achieved will become clearer by the following more detailed description of the components of the pressure regulation system and of the operational sequences which transpire in attaining nominal operating pressures from a start-up condition.

Referring now to FIGS. 2-A through 2-D, as well as FIG. 1, it can be seen that when the printer motor 102 is off and the pumps 8 are not circulating ink (FIG. 2A), the flexible membranes have distended to the pressure head of liquid L in the common reservoir and are all fully expanded within their respective chambers. In this regard, it is desirable in accord with the present invention that the membranes be constructed, and mounted in their chambers, so that each of the membranes is highly pliant to any pressure differential and act as being effectively incapable of supporting a pressure drop across its surface. A preferred embodiment for chamber membrane construction will be described in more detail in FIG. 3; however, the schematic illustrations of FIGS. 2-A to 2-D are useful for general understanding of the invention's function.

When the motor 102 is turned on, the pumps begin to circulate ink within each system and ink flows through chambers 41, 42 and 43 against a back pressure created by flow restrictors 81, 82 and 83 so that ink begins to fill those chambers and to move the flexible membranes upwardly. The upward movements of the membranes additively compress the air in the common reservoir 44. Because the pumping efficiencies of the different pumps 67 will vary, the flow rate through the respective branches will also vary, proportionately, and the filling of the ink flow chambers will pass into a stage such as shown in FIG. 2-B, wherein the degrees of upward deflection of the membranes will reflect their related pumps' efficiencies. For example, as shown in FIG. 2-B, membrane 47 is deflected greatest due to the highest efficiency of its pump 67', membrane 48 has an intermediate deflection due to the intermediate efficiency of pump 67'' and membrane 46 is deflected least due to the lowest efficiency of its pumps 67.

When the flexible membranes have deflected upwardly sufficiently to cause a predetermined nominal pressure condition $p_n$ to be exceeded in common reservoir 44, transducer 100 signals this condition to motor control 101. At this stage, motor control 101 controls motor 102 to decrease (and increase) speed incrementally to maintain the nominal pressure condition $p_n$ in the reservoir 44. While operating in this condition, the membrane 47 associated with the most efficient pump will continue to be deflected upwardly and the membrane 46 associated with the least efficient pump 67 will gradually distend downwardly until it reaches the fully distended condition shown in FIG. 2-C.

Consider now briefly the pressure conditions existing at the stage of the start-up operation that is shown in FIG. 2-C. Because: (i) both chambers 42 and 43 have partially deflected membranes separating ink in their chambers from the common pressure reservoir 44 and (ii) those membranes will not support a pressure differential, the ink pressure in those chambers (and thus the pressure at those chambers' inlets 55, 59) is substantially equal to the common reservoir pressure detected by transducer 100, viz. oscillating about the nominal pressure $p_n$. At this stage the membrane 46 of chamber 41 has become fully distended and now acts as a variable flow restrictor, in series with the fixed restrictor 81 in ingress line 53, which, so long as flow exists through the branch, will cause the pressure at inlet 52 also to be equal to the common reservoir pressure. Each time a given membrane, e.g. membrane 46, becomes fully distended, the motor speed will be reduced to maintain the constant reservoir pressure because the fully distended bladder(s) can no longer change volume.

As the start-up operation continues, membrane 47 will gradually deflect further upward and membrane 48 will distend downwardly until the condition shown in FIG. 2-D evolves. That is, because of the higher efficiency of pump 67' vis-a-vis pump 67'', the increased volume of ink in chamber 42 will cause the common pressure reservoir to force the membrane 48 to the fully distended position, as previously happened to membrane 46. Considering the pressure conditions at this stage, it will be seen that the ink in chamber 42 and thus at its inlet 55 is again approximately equal to the common reservoir pressure, i.e. oscillating about $p_n$. Now, the inlet pressures to both chambers 41 and 43 are maintained equal to the common reservoir pressure by their membrane flow restrictors 46 and 48, in series with their fixed restrictors 81 and 83 in the ingress lines. Once the evolution through the stages shown in FIGS. 2-A through 2-D has occurred, the servo system (which now essentially constitutes membrane 47, common reservoir 44, transducer 100 and motor control 101) quickly stabilizes closely about the $p_n$ condition for reservoir 44. The desired $p_n$ reservoir condition can be determined empirically as the one yielding the desired inlet pressures to the chambers 41, 42, 43, all of which will be substantially identical. In accord with the present invention, the egress lines 51, 55*a* and 58 are designed to produce substantially the same (very low) pressure drop between the print head inlet, from whence they branch, and the chamber inlets 52, 55 and 59. Therefore the pressures of the print heads of all three subsystems are accurately maintained at the desired operating pressure by the common pressure regulating system just described.

Figure 3:
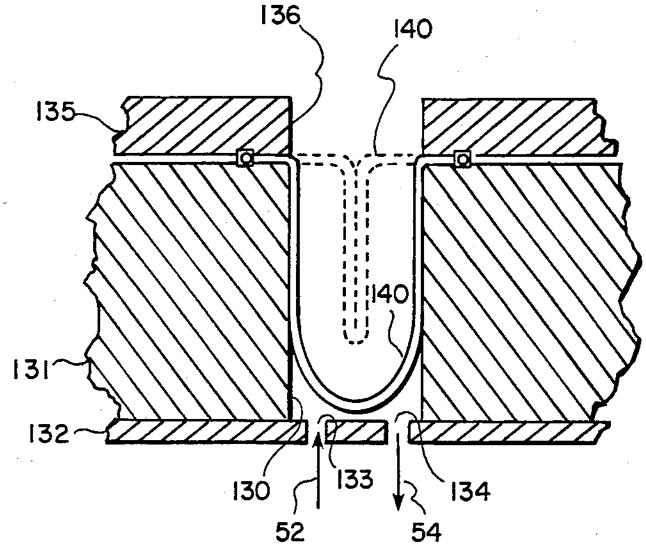
FIG. 3 is a schematic cross section of one preferred construction, for the pressure regulation reservoir inkflow chamber, in accord with the present invention.

Considering next some preferred detail features for practice of the present invention, refer first to FIG. 3 which illustrates a preferred embodiment for the ink-flow chambers and membranes of the pressure referencing assembly 40. Thus, each of the chambers 41, 42 and 43 is formed as shown in FIG. 3 (for subsystem I) having a cylindrical bore 130 in a block 131. A bottomplate 132 has inlet and outlet apertures such as 133, 134 to each of the chambers. For each chamber a cap plate 135 is configured to clamp a bag-shaped membrane such as 140 around its open periphery and has openings 136 to allow fluid communication between the liquid in the common reservoir 44 and the upper side of the membranes. One preferred material for the membrane 140 is a thin plastic web material that is inert to the ink constituents and is highly pliant. Thin (e.g. 10 mil) silicon rubber is also useful.

As illustrated by the solid line position in FIG. 3, each pliant membrane is sized to substantially fill its chamber in its fully expanded condition and is shaped to fold upon itself when collapsed as the flow of ink fills the chamber 130 (see dotted-line position 140'). The construction shown in FIG. 3 provides the advantage that folds created in the membrane 140 during its collapse to the operating poit do not occur in a manner that will decrease the overall pliant nature of the membrane, so that it will remain highly responsive to pressure differentials thereacross.

Also shown in FIG. 3, is one preferred configuration for providing variable restrictors in the ink flow chamber in accord with the present invention. Thus when the membrane 140 is fully distended its lower end is proximate the bottom plate 132 so that flow through chamber 130, from inlet 133 to outlet 134, is restricted. As noted above, such a restriction in cooperation with the restrictor (e.g. 81) in the ingress passage (e.g. 53) functions to reference the pressure in the chamber 130 at the same pressure as the common pressure reservoir 44. In this regard, the cooperative ingress line flow restrictors (e.g. 81) are selected so as to: (i) provide sufficient restriction, or back pressure to effect its initial filling of the ink flow chambers; (ii) be insufficient to cause a pressure drop above the desired nominal common reservoir pressure $p_n$, during the highest mass rate of flow that will occur in the circulation systems and (iii) in series with a fully distended bladder, provide a cumulative restriction in the branch that will allow a continuing branch flow, at all operative conditions, for the circulation subsystem having the least efficient pump. The selection of the particular parameters (e.g. sizes) for such restrictor will, of course, depend upon many other circulation system parameters, but there is a large operative zone for selection of the downstream flow restrictors so that one skilled in the art can determine suitable sizes empirically with little effort. Within the foregoing guidelines the flow restrictors can have a fixed value and the values for the different circulation subsystems need not be the same.

Referring again to FIG. 1, the preferred embodiment of the present invention is to utilize partially compressible and partially incompressible fluid in the common reservoir 44. While the regulation system theorectically will operate solely with liquid in reservoir 44, the pressure variation of the working fluid will respond at the speed of sound in liquid. The bladders will act as simple fluid separators that communicate the reservoir pressure to the working fluid without the benefit of substantial expansion and contraction of the bladder volume. It is extremely difficult to design a stable servo circuit for controlling such a regulation system. When a partial volume of gas is incorporated in the common reservoir, the compressibility of the gas dampens instantaneous perturbations of circulation subsystems and significantly simplifies the design of a stable servo-control circuit. In this regard, the response or gain of the pressure signal transmitted to transducer 100 from reservoir 44 is inversely proportional to the quantity of gas within reservoir 44; and it is preferred to select a volume of gas such that the resultant control system gain effects its variations on a stable portion of the control system curve. It is useful in some systems for the downstream restrictors (e.g. 81) to be adjustable, in order to fine tune the response of the regulation system once initial gas/liquid volume proportions are selected.

Figure 4:
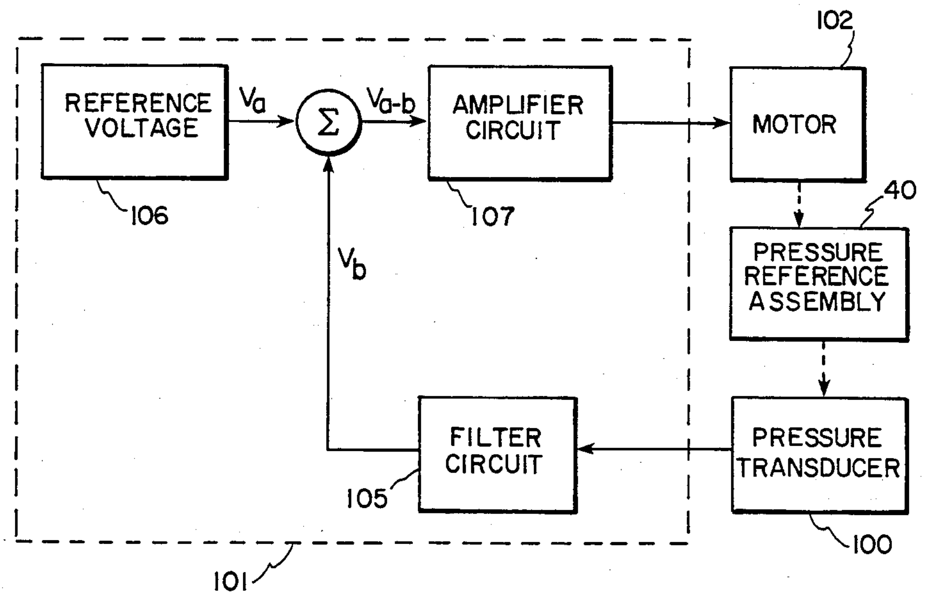
FIG. 4 is a block diagram illustrating one preferred motor control embodiment in accord with the present invention.

Referring to FIG. 4, one exemplary servo system provides for the condition of pressure referencing assembly 40, as detected by transducer 100, to be signalled to the filter circuit 105 of motor control circuit 101. Filter circuit 105 provides an adjustment signal $V_b$, which is combined with a reference signal $V_a$ from source 106. The resultant signal $V_{a-b}$ is proportioned by amplifier circuit 107 and applied to motor 102. The motor 102 is thereby controlled to effect pump pressures that cause the pressure in the common reservoir to exist in a dampaned oscillation about nominal pressure $p_n$. As noted, $p_n$ is selected to dictate the desired ink pressures for the print head inlets.

While the functional approach of the present invention has been described with respect to one particular ink circulation system embodiment, it will be understood that it can be employed in many alternative configurations. For example, the pressure detection branches which lead to and from the referencing assembly 40 can emanate from, and terminate to, various other portions of the ink circulation subsystems. For example, such detection branch can be employed in series or parallel with bypass lines 77 of FIG. 1, at the outlet side of the print head, etc. It is highly preferred, however, that the branch emanate from a location in the circulation system that will accurately reflect the pressure condition at the print head, i.e. from a location that will not present any significant variable pressure drop between the detection branch egress and the print head inlet.

Further, it will be understood that the pressure referencing assembly of the present invention can perform its function in various alternative configurations. One such alternative embodiment can employ a preselection, or presetting, of the pump efficiencies so that the highest efficiency pump is coupled to a bladder/valve chamber, e.g. such as described with respect to FIG. 3. Highest efficiency pump output can be assured in various ways, e.g., making restrictor 78 variable, increasing the flow through conduit 77 or adjusting restrictor 62 to adjust the flow to the print head and the regulation reservoir 44. With the assurance that this condition exists, the remaining detection branches can be constructed with pliant membranes that merely extend across the chamber inlet and outlet to function always in the modes described with respect to membranes 46 and 48 in their stabilized condition in the foregoing example, i.e. as variable restrictors which control their inlet pressures to that of the common reservoir. While such an embodiment is somewhat simpler in construction and faster in achieving nominal operating conditions, it does not afford the advantage of handling pump sets that can vary as to dominant efficiency during their useful life, as exists with respect to the FIG. 1 embodiment.

The invention has been described in detail with particular reference to preferred embodiments thereof, but it will be understood that variations and modifications can be effected within the spirit and scope of the invention.

I claim:

1. In continuous ink jet printing apparatus of the kind having a plurality of discrete ink circulation systems that respectively circulate different color inks for different ink jet print heads and in which each such circulation system includes: (i) an ink supply reservoir, (ii) a supply conduit extending from the system reservoir to the system print head and (iii) pump means for delivering ink through said supply conduit, an improved ink pressure regulation system comprising:

(a) a plurality of pressure regulation branch conduits each respectively extending from sites of their respective circulation system that are indicative of their system's print head pressure to a return for their systems's ink supply reservoir, each such branch conduit including along its passage, a flexible conduit portion that is highly pliant to pressure differentials thereacross;

(b) common pressure reservoir means including a substantially rigid housing confining detection fluid in common fluid communication with the exterior of all of the branch conduit flexible portions;

(c) a variable drive means commonly coupled to each system's pump means; and (d) detection and control means for regulating said common pump drive means in response to variations in the pressure of said detection fluid to maintain the pressure at each of said system sites at a common nominal pressure.

2. The invention defined in claim 1 wherein at least one of said flexible conduit portions comprises (i) wall means defining an ink chamber having an ink inlet and an ink outlet passage and a pressure control opening adjacent said common pressure reservoir and (ii) a colapsible bladder member which separates said chamber and said common pressure reservoir and is constructed and mounted so as to expand or contract within said chamber respectively in response to the fluid pressure differential thereacross.

3. A system for supplying a plurality of liquids at a uniform reference pressure, said system comprising:

(a) first and second liquid supply sources;

(b) first and second supply conduits, respectively including first and second pump means and respectively extending from said first and second supply sources to first and second branch junctures;

(c) first and second discharge outlets respectively coupled to said branch junctures;

(d) first and second bypass passages respectively extending from said branch junctures to first and second bypass outlets;

(e) first and second flexible passage portions, each respectively forming a portion of one of said first and second bypass passages and being distendable in response to fluid pressure differential thereacross;

(f) common pressure reservoir means enclosing a fluid in common communication with the exterior of said first and second flexible passage portions;

(g) a variable speed motor drivingly coupled to said first and second pump means;

(h) transducer means for detecting and signalling the pressure condition of fluid in said common pressure reservoir; and (i) control means for regulating the speed of said motor in response to signals from said transducer means.

4. In continuous ink jet printing apparatus of the kind having a plurality of discrete ink circulation systems that respectively circulate different color inks to and from different ink jet print heads and in which each such circulation system includes: (i) an ink supply reservoir, (ii) a supply conduit extending from the system reservoir to the system print head and (ii) pump means for delivering ink through said supply conduit, an improved ink pressure regulation system comprising:

(a) a plurality of detection bypass conduits each respectively extending away from and back to its circulation system, each such bypass conduit including pressure-distendable bladder/valve means;

(b) common pressure reservoir means including a rigid housing confining a detection fluid in common communication with the exterior of each bladder/valve means;

(c) a source of variable pump drive commonly coupled to each system's pump means; and (d) detection and control means for varying said common drive source in response to variations in the pressure of said detection fluid so as to regulate the pressure at each print head to the same nominal pressure.

5. The invention defined in claim 1 wherein each of said bladder/valve means comprises (i) wall means defining an ink chamber having ink inlet and outlet passages and a pressure control opening in fluid communication with said common pressure reservoir and (ii) a pliant membrane that separates said chamber and said common pressure reservoir and is constructed and mounted so as to expand and collapse within said chamber respectively in response to increase or decrease of fluid pressure in said common pressure reservoir.

6. A system for supplying a plurality of liquid at a uniform reference pressure, said system comprising:

(a) first and second liquid supply sources;

(b) first and second supply conduits, respectively including first and second pump means and respectively extending from said first and second supply sources to first and second branch junctures;

(c) first and second discharge outlets respectively coupled to said branch junctures;

(d) first and second bypass passages respectively extending from said branch junctures to first and second bypass outlets;

(e) first and second bladder/valve means respectively located in said first and second bypass passages;

(f) common pressure reservoir means enclosing a fluid in common communication with said first and second bladder/valve means;

(g) a variable speed motor drivingly coupled to said first and second pump means;

(h) transducer means for detecting and signalling the pressure condition of fluid in said common pressure reservoir; and (i) control means for regulating the speed of said motor in response to signals from said transducer means.

7. In continuous ink jet printing apparatus of the kind having a plurality of discrete ink circulation systems that respectively circulate inks for different ink jet print heads and in which each such circulation system includes; (i) a supply conduit extending from an ink supply reservoir to the system print head and (ii) pump means for delivering ink through said supply conduit, an improved ink pressure regulation system comprising:

(a) a plurality of pressure regulation branch conduits each respectively extending from sites of their respective circulation system that are indicative of their system's print head pressure to a return to the ink supply reservoir, each such branch conduit including along its passage, a flexible conduit portion that is highly pliant to pressure differentials thereacross;

(b) common pressure reservoir means including a substantially rigid housing confining detection fluid in common fluid communication with the exterior of all of the branch conduit flexible portions;

(c) a variable drive means commonly coupled to each system's pump means; and (d) detection and control means for regulating said common pump drive means in response to variations in the pressure of said detection fluid to maintain the pressure at each of said system sites at a common nominal pressure.

* * * * *